United States Patent [19]
Tsuruoka et al.

[11] Patent Number: 5,197,336
[45] Date of Patent: Mar. 30, 1993

[54] KARMAN VORTEX FLOW METER

[75] Inventors: Michihiko Tsuruoka; Wataru Nakagawa; Osamu Kashimura; Naohiro Kounosu, all of Kanagawa, Japan

[73] Assignee: Fuji Electric Co., Ltd., Kanagawa, Japan

[21] Appl. No.: 647,225

[22] Filed: Jan. 29, 1991

[30] Foreign Application Priority Data

Jan. 29, 1990 [JP] Japan .................................. 2-18451

[51] Int. Cl.⁵ .............................................. G01F 1/32
[52] U.S. Cl. .................................................. 73/861.24
[58] Field of Search ...................... 73/861.24, 861.22

[56] References Cited

U.S. PATENT DOCUMENTS

| | | | |
|---|---|---|---|
| 4,248,098 | 2/1981 | Sawayama et al. | 73/861.24 |
| 4,526,040 | 7/1985 | Matsubara | 73/861.24 |
| 4,679,445 | 7/1987 | Knudsen et al. | 73/861.24 |
| 4,706,503 | 11/1987 | Kamentser | 73/861.24 |
| 4,782,710 | 11/1988 | Nagumo et al. | |
| 4,791,818 | 12/1988 | Wilde | 73/861.24 |
| 4,803,870 | 2/1989 | Lew | 73/861.24 X |
| 4,926,695 | 5/1990 | Kleven et al. | 73/861.24 |
| 4,984,471 | 1/1991 | Storer | 73/861.24 |

FOREIGN PATENT DOCUMENTS 58-4967  1/1983 Japan .
63-32127 6/1988 Japan .

Primary Examiner—Herbert Goldstein
Attorney, Agent, or Firm—Finnegan, Henderson, Farabow, Garrett & Dunner

[57] ABSTRACT

A Karman vortex flow meter for measuring the flow rate of a fluid under test in a pipeline having a base to be secured to the pipeline, and a vortex detector having an axis intended to intersect the pipeline. The vortex detector includes a post, a detector flange at least partially surrounding the post having a free surface, a columnar force receiving part extending from the post into the pipeline for producing a Karman vortex, and a strain detecting element coupled to the free surface for detecting the Karman vortex and producing an output signal corresponding to the detected Karman vortex.

10 Claims, 5 Drawing Sheets

KARMAN VORTEX FLOW METER

BACKGROUND OF THE INVENTION

1. Field of the Invention

This invention relates to a Karman vortex flow meter which measures the flow speed, or rate of a fluid under test, by detecting the frequency of Karman vortex streets formed on both sides of a vortex generating element placed in the stream of the fluid under test and its manufacturing method.

2. Discussion of the Related Art

In a conventional Karman vortex flow meter, for example, as disclosed by Japanese Patent Application Publication No. 4967/1983, a stress detecting unit having a piezo-electric element is sealed (e.g., with glass) in a vortex generating element to detect variations in pressure caused by alternating forces of Karman vortexes in the vortex generating element. The Karman vortex flow meter has an advantage in that the stress detecting unit is not in contact with the fluid under test which flows in the pipeline of the flow meter, and thus is not contaminated by the fluid. However, in the conventional Karman vortex flow meter, when external vibrations are generated in the pipeline, vibrations having a mode the same as that of the vortex pressure are introduced as noise in the vortex generating element of the flow meter, resulting in low S/N ratio, i.e., low measurement accuracy.

Several attempts have been made to solve these problems in the past. For example, the Karman vortex flow meter having a vibration compensating device has been proposed by Japanese Patent Application Publication No. 32127/1988. The vibration compensating device is outside the pipeline and the vortex generating element is partially inside the side wall of the pipeline. One vibration sensor is provided in the portion of the vortex generating element inside the side wall of the pipeline to produce an output signal corresponding to the frequency of Karman vortexes produced in the vortex generating element. Another vibration sensor is provided in the vibration compensating unit outside the pipeline to produce an output signal to cancel the portions of the output signal of the first vibration sensor associated with the external vibration.

In the above type Karman vortex flow meter, to eliminate noises from the external vibration, a plurality of vibration sensors are required, and the measurement accuracy of the flow meter substantially depends on the quality of the output signals of these vibration sensors. Therefore, to insure the measurement accuracy, the output signals of these sensors are adjusted (called the "actual flow adjustment" hereinafter).

Since the vortex generating element must be vibrated during the adjustment, in the actual flow adjustment, the output signals of the vibration sensors are adjusted while the fluid under test is allowed to flow in the pipeline. This makes the actual flow adjustment very difficult a special skill and thus expensive.

SUMMARY OF THE INVENTION

One object of the present invention is to provide a Karman vortex flow meter which can accurately measure the flow rate of the fluid under test, without being affected by external vibrations or requiring the actual flow adjustment.

To achieve the object and in accordance with the purpose of the invention, as embodied and broadly described herein, the Karman vortex flow meter of the present invention includes a pipeline for containing a fluid under test flowing in a lateral direction with respect to the pipeline, a base fixedly secured to the pipeline, and a vortex detector having an axis substantially perpendicular with the lateral direction. The vortex detector includes a post coaxial with the vortex detector, a detector flange substantially coaxial with and at least partially surrounding the post, which detector flange has a free surface on one side and a peripheral end portion fixedly secured to the base on the other side, a columnar force receiving part coaxial with the post and extending from the post into the pipeline for producing a Karman vortex, and a strain detecting element coupled to the free surface for detecting the Karman vortex and producing an output signal corresponding to the detected Karman vortex.

Another object of the invention is to provide a method of making a Karman vortex flow meter including a base having a base flange, and a vortex detector having a detector flange with a peripheral end portion adjacent the base flange. The method of the present invention, as embodied and broadly described herein, includes forming a protrusion on the peripheral end portion of the detector flange, positioning the protrusion in contact with the base flange to form a joint, and applying pressure and electric current simultaneously to the joint to thermally fuse the protrusion of the detector flange and base flange.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

The accompanying drawings, which are incorporated in and constitute a part of this specification, illustrate several embodiments of the invention and together with the description, serve to explain the principles of the invention.

DESCRIPTION OF THE PREFERRED EMBODIMENTS

Reference will now be made in detail to the present preferred embodiments of the invention, examples of which are illustrated in the accompanying drawings. Wherever possible, the same reference numbers will be used throughout the drawings to refer to the same or like parts.

The Karman vortex flow meter according to a first embodiment of the present invention will be described in reference to FIGS. 1-6.

Figure 1:
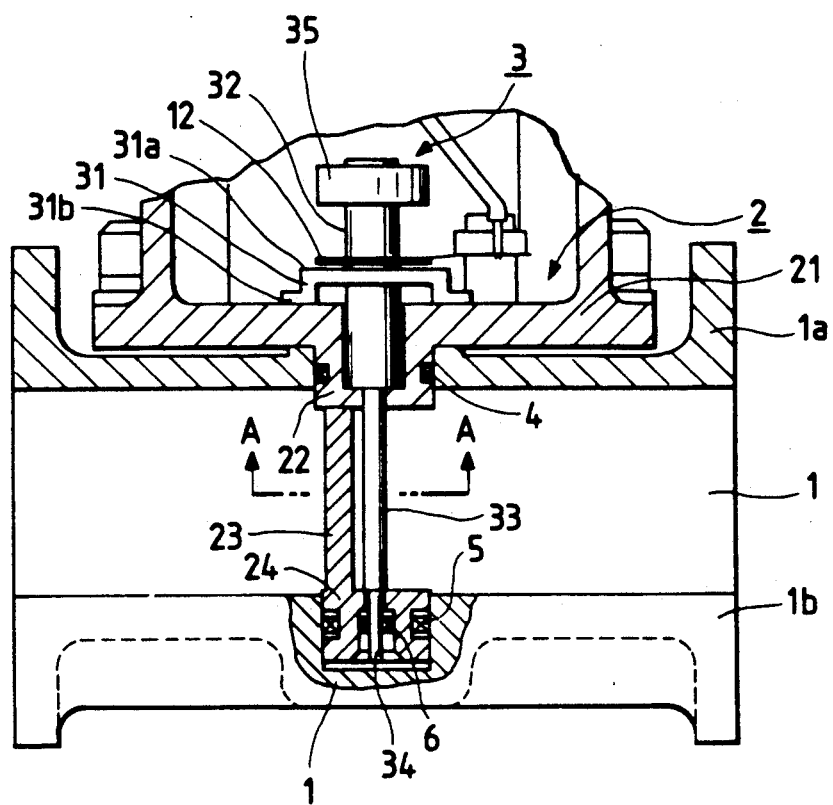
FIG. 1 is a cross-sectional view of the Karman vortex flow meter according to the first embodiment of the present invention.

In FIG. 1, the Karman vortex flow meter of the first embodiment of the invention includes a pipeline 1, a base 2 and a vortex detector 3. The fluid under test flows in pipeline 1 in a lateral direction with respect to pipeline 1.

Base 2 essentially includes a base flange 21 for securing base 2 to the side wall of pipeline 1, preferably with screws; a support 22 formed at the center of base flange 21 and shaped to be inserted into the side wall of an upper portion 1a of pipeline 1; an upstream columnar body 23 extending from support 22 to the side wall of a lower portion 1b of pipeline 1 for accelerating the generation of Karman vortexes; and a support 24 formed at an end portion of upstream columnar body 23 as means for securing the elongated detector elements of the side wall of lower portion 1b of pipeline 1. Supports 22 and 24 are inserted into the side wall of respective portions of pipeline 1 through O-rings 4 and 5, respectively, to prevent the vibration of upstream columnar body 23.

The vortex detector of the Karman vortex flow meter detects Karman vortex streets produced downstream of a vortex generating element inserted into a pipeline through which the fluid under test flows. Vortex detector 3, as embodied and broadly described herein, essentially includes a detector flange 31 secured to an upper surface of base flange 21 of base 2; a post 32 having a lower portion extending from detector flange 31 into support 22 and an upper portion extending outwardly from detector flange 31; a force receiving part 33 extending from the lower portion of post 32 parallel to the detector axis; a support 34 formed at an end portion of force receiving part 33 and inserted, through an O-ring 6, as a means for securing it to the central portion of support 24 of base 2; and a balance weight 35 axially aligned with post 32 and movable upwardly and downwardly along the upper portion of post 32. Balance weight 35 has a weight substantially equal to that of force receiving part 33.

All of the above components of vortex detector 3 are axially aligned with one another. O-ring 6 is provided to prevent the vibration of the end portion of force receiving part 33. Detector flange 31 includes a free surface 31a which serves as a diaphragm. The peripheral portions of detector flange 31 are welded gas tight to the upper surface of base flange 21. A strain detecting element 12 (i.e., a sensor) is secured to free surface 31a and is prevented from contacting the fluid under test in pipeline 1, so as not to be contaminated by the fluid.

Figure 2:
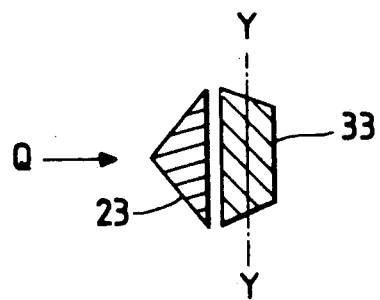
FIG. 2 is a cross-sectional view of the upstream columnar body and the force receiving part of the vortex detector of FIG. 1 taken along line A—A.

FIG. 2 is a cross-sectional view of upstream columnar body 23 at base 2 and force receiving part 33 of vortex detector 3, taken along line A—A in FIG. 1. The sectional view of upstream columnar body 23 has an isosceles triangular shape having two sides of equal length and a base, and that of force receiving part 33 of vortex detector 3 has a trapezoid shape having a base in parallel with a top side. The base of the triangle of upstream columnar body 23 is adjacent the base (the longest side) of the trapezoid of force receiving part 33, and these bases are substantially equal to one another in length. An arrow Q in FIG. 2 indicates the direction of flow of the fluid under test in the pipeline.

Upstream columnar body 23 and force receiving part 33 essentially form the Karman vortex generating element in a broad sense: force receiving part 33 being a main part for forming vortexes, and upstream columnar body 23 being auxiliary thereto to accelerate the formation of vortexes. Karman vortex streets are produced downstream of the Karman vortex generating element when the Karman vortex generating element is inserted in the pipeline to detect the Karman vortex streets to measure the flow speed of the fluid under test in the pipeline.

The Karman vortex flow meter, as embodied herein, is designed such that when vortex detector 3 is externally vibrated or shocked (referred to as "external vibration" hereinafter), the amount of the bending moments externally applied to balance weight 35 and to force receiving part 33 with respect to free surface 31a by an inertial force (referred to as "an inertial bending moment" hereinafter) is substantially equal in magnitude and opposite in their applied directions to eliminate noise resulting from the external vibration. The positioning along the axis of post 32, dimension and weight of balance weight 35 is carefully controlled to maintain the above balance. In other words, when vortex detector 3 is externally vibrated, the inertial bending moment (with respect to free surface 31a) is canceled.

Figure 3:
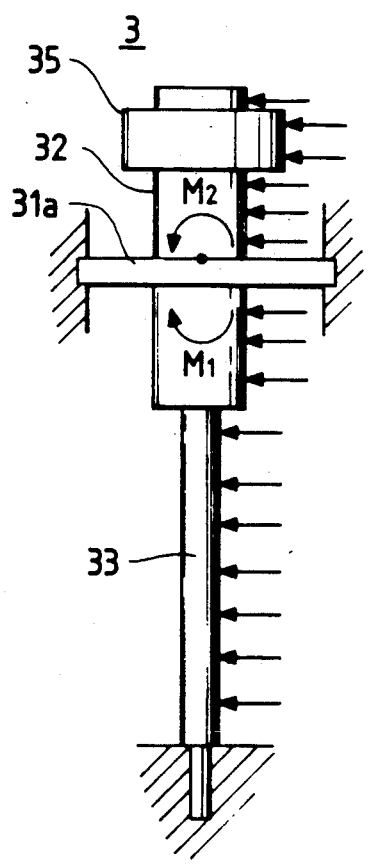
FIG. 3 illustrates the principle of operation of the vortex detector of FIG. 1 under one condition.
Figure 4:
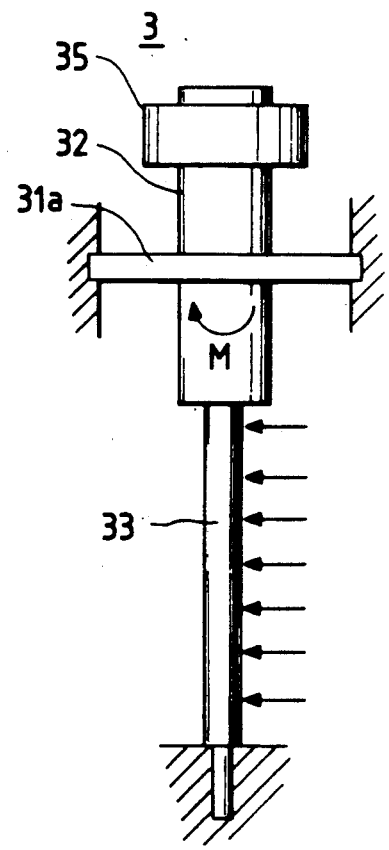
FIG. 4 illustrates the principle of operation of the vortex detector of FIG. 1 under another condition.

More specifically, in FIG. 3, an inertial bending moment M1 with respect to free surface 31a is caused by inertial forces (indicated by arrows) applied to the lower portion of post 32 and force receiving part 33. An inertial bending moment M2 is caused by inertial forces applied to the upper portion of post 32 and balance weight 35. Inertial bending moments M1 and M2 are substantially equal in magnitude, and opposite in directions, so that they are canceled out. Under this balanced condition, as shown in FIG. 4, when a bending moment M with respect to free surface 31a is caused by Karman vortex forces (indicated by arrows) applied to force receiving part 33, strain detecting element 12 (shown in FIG. 1), which is secured to free surface 31a, produces an output signal corresponding only to the vibration frequency of the Karman vortex forces, free from the external vibration.

Figure 5:
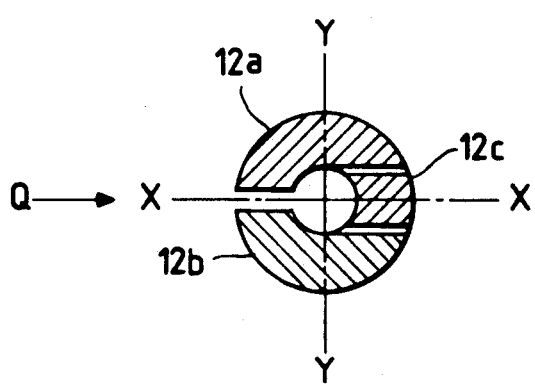
FIG. 5 is a cross-sectional view of an upper portion of the stain detecting element of the vortex detector of FIG. 1.
Figure 6:
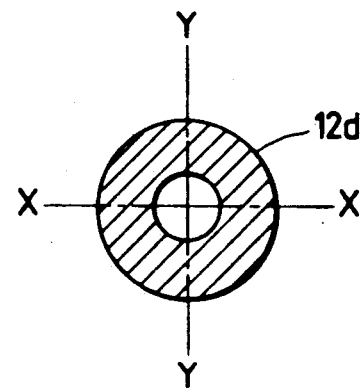
FIG. 6 is a cross-sectional view of a lower portion of the strain detecting element of the vortex detector of FIG. 1.

Strain detecting element 12 may be an annular piezoelectric element bondable to free surface 31a. FIG. 5 is a plan view of a top layer of strain detecting element 12, and FIG. 6 is that of a bottom layer thereof. As shown in these figures, the top layer of strain detecting element 12 includes electrodes 12a, 12b, and 12c and the bottom layer includes an electrode 12d. The piezo-electric material is sandwiched between the top and bottom layers.

Electrodes 12a and 12b are split electrode portions which are symmetrically spaced from one another with respect to an axis X—X which axis is intended to be parallel with the direction of flow of the fluid under test in pipeline 1. Electrodes 12a and 12b are fixedly secured to one side of strain detecting element 12. Electrode 12d is electrically coupled to the slit electrodes 12a and 12b, and fixedly secured to the opposite side. Electrode 12c is disposed intermediate electrodes 12a and 12b, and spaced therefrom. Electrode 12c is secured to the opposite side and integral with common electrode 12d. Since it is difficult to provide an output signal from the inner electrode 12d, the output signal is provided from outer electrode 12c since it is electrically coupled to electrode 12d.

As is apparent from the above description, strain detecting element 12, for example, of piezo-electric type, detects alternating forces acting on force receiving part 33 only in directions along an axis Y—Y (i.e., the direction of dynamic lift), independent of the forces acting in axis X—X (i.e., the direction of the external vibration) or direction Q of the stream of the fluid under test. Therefore, the output signal of strain detecting element 12 corresponds only to the flow speed or rate of the fluid under test, and is not affected by the external vibration. As a result, the output signal is doubled in strength compared to the conventional electronic circuit, thus greatly improving the sensitivity and accuracy of measurement.

The Karman vortex flow meter according to a second embodiment of the invention will be described with reference to FIGS. 7-9. The flow meter of the second embodiment is particularly suitable for a pipeline having a relatively large diameter.

The Karman vortex flow meter of the first embodiment of the present invention is effective for removing the external vibration noise, particularly for a pipeline having a relatively small diameter, but yet it has a simple construction. However, for a pipeline with a relatively large diameter, the length of force receiving part 33 of vortex detector 3 of the flow meter of the first embodiment has to be substantially extended, thereby reducing its natural frequency.

For example, in the Karman vortex flow meter of the first embodiment, force receiving part 33 functions as a main part of the vortex generating elements. When the extraneous (not flow inducing) vibration frequency in the vortex generating element is high, force receiving part 33 tends to resonate with the extraneous vibration frequency, causing vortex detector 3 to operate erroneously.

In view of the foregoing, in the Karman vortex flow meter of the second embodiment of the present invention, force receiving part 33 of vortex detector 3 is made independent of the vortex generating element to not be affected by its effect such that vortex detector 3 operates free of error even for a pipeline with a relatively large diameter.

Figure 7:
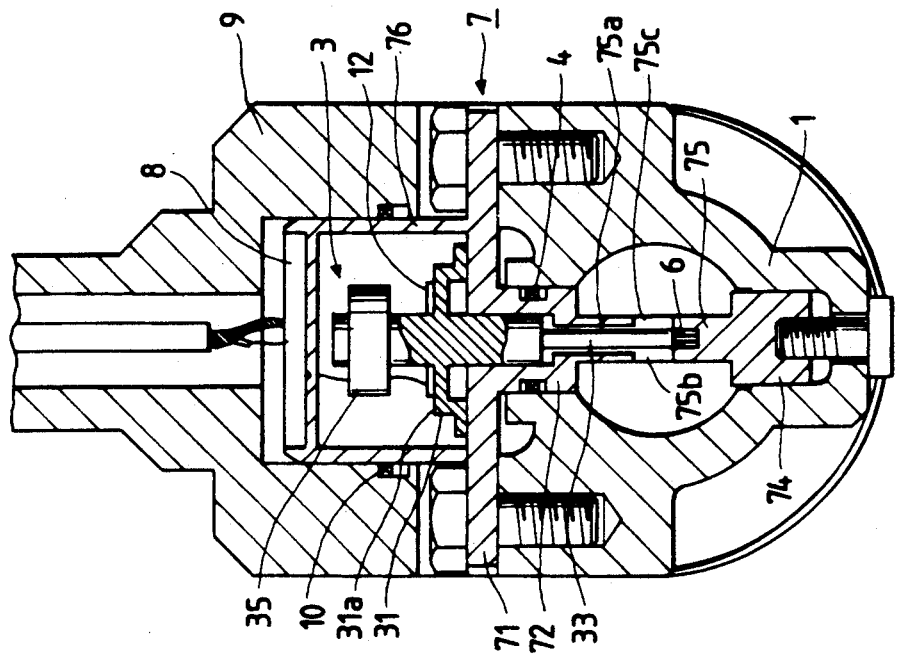
FIG. 7 is a cross-sectional view of the Karman vortex flow meter according to the second embodiment of the present invention.
Figure 8:
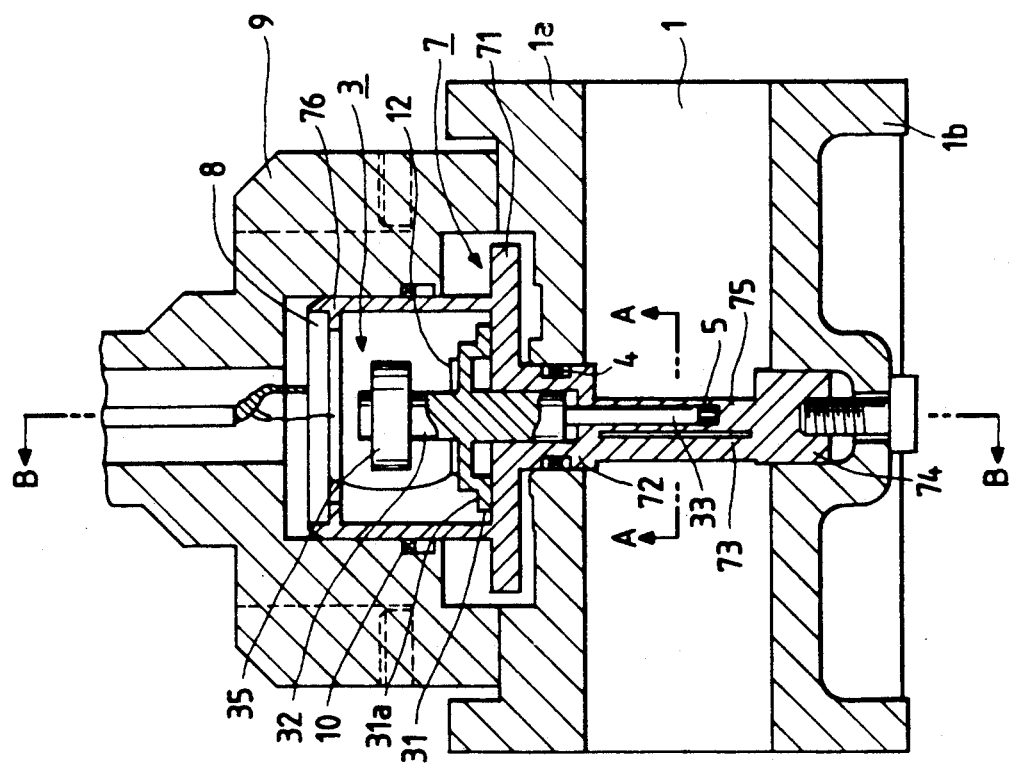
FIG. 8 is a cross-sectional view of FIG. 7 taken along line B—B from a different perspective.
Figure 9:
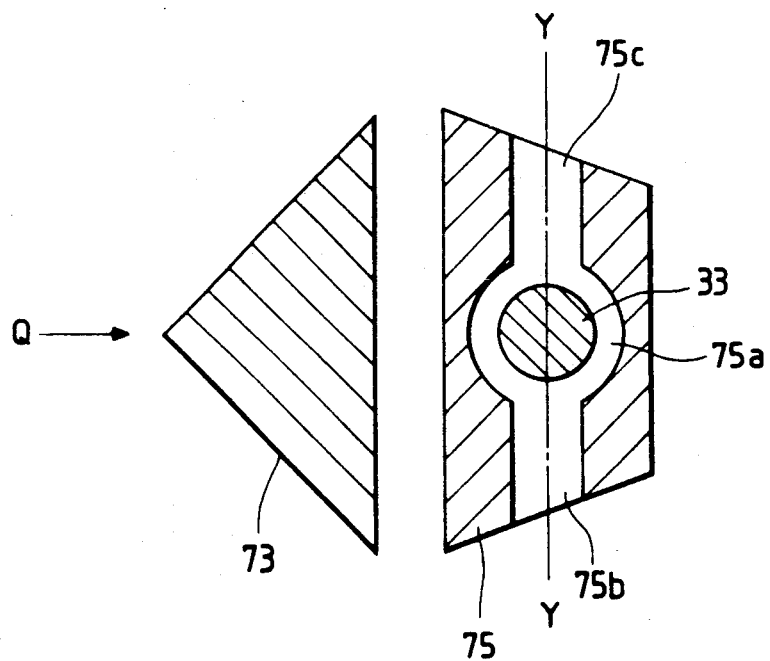
FIG. 9 is a cross-sectional view of the upstream columnar body and the force receiving part of the vortex detector of FIG. 7 taken along line A—A.

In FIGS. 7-9, those components which have been previously described in reference to the Karman vortex flow meter of the first embodiment are designated by the same reference numerals.

In FIGS. 7 and 8, base 7 includes a base flange 71 secured to pipeline 1 with screws; a support 72 inserted in the side wall of upper portion 1a of pipeline 1; a support 74 inserted and secured with screws in the side wall of lower portion 1b of pipeline 1; an upstream columnar body 73 having a cross-section of an isosceles triangular shape having a base and two sides of equal length, which extends between supports 72 and 74; a downstream columnar body 75 having a cross-section of an isosceles trapezoidal shape having a top and bottom in parallel to one another and two sides, which extends into lower portion 1b of pipeline 1; and a circuit box fixing member 9 secured to pipeline 1.

Upstream and downstream columnar bodies 73 and 75 essentially form the vortex generating element. The peripheral end portions of detector flange 31 are welded to the upper surface of base flange 71 of base 7. A circuit box 76 is disposed on base flange 71 and covers vortex detector 3. A circuit board 8 on the circuit box 76 is electrically coupled to and detects the output signal of strain detecting element 12 of vortex detector 3. An O-ring 10 between the side wall of circuit box 76 and the side wall of circuit box fixing member 9 secures circuit box 76 gas-tight to circuit box fixing member 9.

As shown in FIG. 9, downstream columnar body 75, which functions as part of the vortex generating element, has side openings 75b and 75c on each respective side of the trapezoid, and an inserting hole 75a being hollow for a substantial portion of columnar body 75 and extending along the axis of downstream columnar body 75. Side openings 75b and 75c communicate to one another, and hole 75a communicates to side openings 75b and 75c.

As shown in FIG. 7, force receiving part 33 of vortex detector 3 extends from post 32 of vortex detector 3 at least to the center or a midpoint between upper and lower portions 1a and 1b of pipeline 1 and is inserted into inserting hole 75a of downstream columnar body 75, fixedly secured by an O-ring 5 therein. Therefore, force receiving part 33 of vortex detector 3 of the second embodiment, is made independent of the vortex generating element.

In the Karman vortex flow meter constructed as such, Karman vortexes are detected as follows. Referring to FIG. 9, when Karman vortexes are produced by upstream and downstream columnar bodies 73 and 75, the pressure at side opening 75b of downstream columnar body 75 is decreased relative to the pressure at side opening 75c thereof, causing force receiving part 33 of vortex detector 3 in inserting hole 75a deformed towards side opening 75b. The Karman vortexes are produced on each side (of the trapezoid) of downstream columnar body 75 alternately, causing force receiving part 33 to vibrate in directions along an axis Y—Y.

The vibration of force receiving part 33 deforms free surface 73a of vortex detector 3. Strain detecting element 12 which is bonded to free surface 31a produces an output voltage signal corresponding to the deforming of free surface 73a and associated with the frequency of the Karman vortexes. Noise from the external vibration is eliminated by the bending moment associated with the inertial force acting on the part of vortex detector 3 above free surface 31a in a manner similar to the Karman vortex flow meter of the first embodiment.

In the Karman vortex flow meter of the second embodiment of the invention, since force receiving part 33 of vortex detector 3 is inserted into inserting hole 75a of downstream columnar body 75 independent thereof, variations in pressure associated with the Karman vortexes are induced to openings 75a, 75b, and 75c of downstream columnar body 75, making vortex detector 3 independent of the vortex generating element. Therefore, even for a pipeline with a large diameter, force receiving part 33 of vortex detector 3 does not need to be extended beyond the center point of the pipeline and, thus, can be made smaller than otherwise required to set its natural frequency to a high value.

The Karman vortex flow meter of the second embodiment does not operate erroneously even when the frequency of the external vibration applied to the flow meter is high. Furthermore, when the flow rate of the fluid under test is measured for more than one pipeline having a large diameter, only one common vortex detector 3 can be used for pipelines having different diameters. Therefore, a different vortex detector for each pipeline having a different diameter is not required, reducing manufacturing costs.

Figure 10:
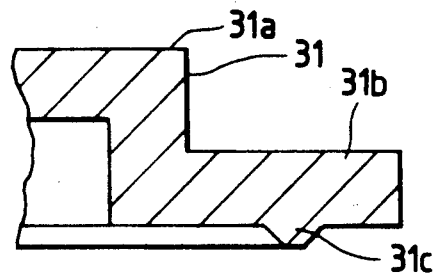
FIG. 10 is a detailed cross-sectional view of a portion of the detector flange of the vortex detector of the Karman vortex flow of the present invention.
Figure 11:
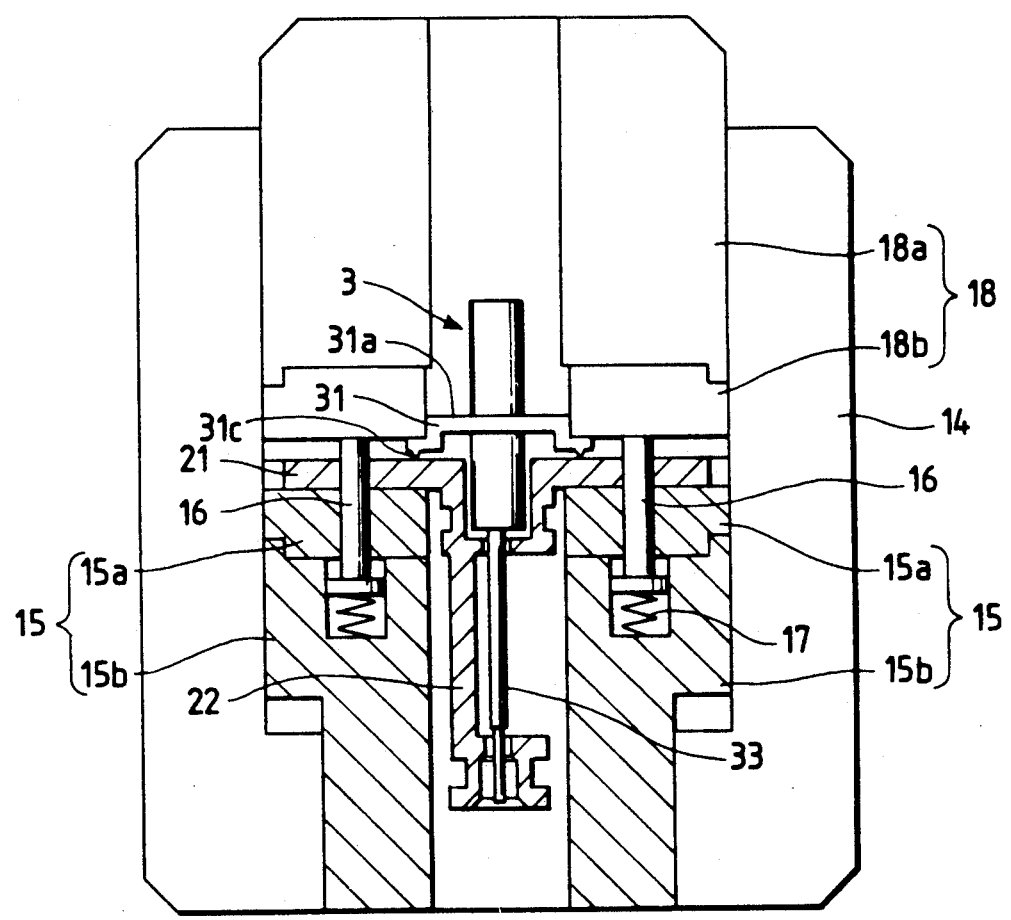
FIG. 11 is another cross-sectional view of the Karman vortex flow meter of the present invention to illustrate the manufacturing method of the present invention.

Now, the method of manufacturing the Karman vortex flow meter of the invention will be described in reference to FIGS. 1, 10 and 11. FIG. 10 is a cross-sectional view of a portion of detector flange 31 of vortex detector 3 of FIG. 1 to illustrate how detector flange 31 is welded to base flange 21. FIG. 11 is a cross-sectional view of an upper portion of the Karman vortex flow meter to illustrate how the vortex detector is coupled to the base of the flow meter.

As discussed above and shown in FIG. 1, the Karman vortex flow meter includes base 2 and vortex detector 3. Base 2 includes upstream columnar body 23 and base flange 21. Vortex detector 3 includes force receiving part 33, which functions as a vortex generating element with upstream columnar body 23. Vortex detector 3 is fixedly secured by welding detector flange 31 to base flange 21.

A full-circled arc welding can be used to weld detector flange 31 to base flange 21. However, in the full-circled arc welding, peripheral end portion 31b of detector flange 31 is welded continuously, locally thermally straining the weld of detector flange 31 and base flange 21. As a result, upstream columnar body 23 is axially out of alignment with respect to force receiving part 33.

The misalignment adversely affects not only the generation of Karman vortexes, but also the proportional relationship between the vortex frequency and the flow speed of the fluid under test. Furthermore, since the full-circled arc welding normally takes relatively a long time, and thus produces residual stresses in free surface 31a of detector flange 31, and strain detecting element 12 is bonded to free surface 31a, variations in the output signal from strain detecting element 12 occur.

In view of the foregoing and as shown in FIG. 10, in the manufacturing method according to the present invention, an annular protrusion 31c is formed on the lower surface of peripheral end portion 31b of detector flange 31 adjacent base flange 21, and resistance welding is done on annular protrusion 31c. Annular protrusion 31c may have a cross-section of a trapezoid shape.

Referring to FIG. 11, during the resistance welding, a lower member 15a of a lower electrode 15 is placed inside a guide 14 of the welding device, and positioning pins 16 with springs 17 are inserted into an upper member 15b of lower electrode 15. Upper member 15b is disposed on lower member 15a of lower electrode 15. Base flange 21 of upstream vortex body 23 is mounted on the lower member 15b of lower electrode 15 with positioning pins 16 as a guide. Annular protrusion 31c of detector flange 31 of vortex detector 3 is placed to be in direct contact with base flange 21. Then, upper and lower members 18a and 18b of upper electrode 18 are mounted over and surrounding vortex detector 3.

According to the method of the present invention, since detector flange 31 of vortex detector 3 and base flange 21 of upstream columnar body 23 are laterally positioned in parallel to one another during the resistance welding, the axial misalignment of upstream columnar body 23 with respect to force receiving part 33 does not occur.

Under this condition, a 12.5 kA current is applied to lower and upper electrodes 15 and 18 for twenty seconds while a pressure (of 300 kgf, for example) is applied coaxially to electrodes 15 and 18. Since the current and pressure is concentrated on annular protrusion 31c of detector flange 31 of vortex detector 3 and base flange 21 of upstream columnar body 23, thermal fusion takes place by contact resistance, thus permitting quick welding (e.g., two seconds).

In the above example, annular protrusion 31c of detector flange 31 has a cross-section of a trapezoid shape. The invention is not limited thereto. For instance, the cross-section of annular protrusion 31c may have a semicircular, triangular, or any other shape which may facilitate concentrating the current and pressure on annular protrusion 31c.

According to the method of the present invention, since detector flange 31 of vortex detector 3 is not strained during welding, and the axial misalignment is minimized, variations in the production of Karman vortexes and in the proportional relationship between the vortex frequency and the flow speed of the fluid under test can be controlled. Further, since no residual stress or strain exists in free surface 31a of detector flange 31, strain detecting element 12 can detect a horizontally symmetrical strain produced by vortex pressure, i.e., little variations in the output from strain detecting element 12. Further, since the welding is done in a relatively short time, little heat is generated during the welding, allowing the welding to be performed even when strain detecting element 12 (e.g., of a piezo-electric element) is connected to free surface 31a of detector flange 31. Thus, according to the manufacturing method of the present invention, the welding to be done with ease and high yield.

In summary, the Karman vortex flow meter of the present invention has several advantages. For example, (1) A highly accurate measurement of the flow speed or rate of the fluid under test is obtained and the measurement is not affected by the external or extraneous vibration or shock.

(2) Since the actual flow adjustment is not required, the operability of the flow meter is improved, and the manufacturing cost is reduced.

(3) Since the output of the strain detecting element of the flow meter responds only to the flow speed or rate of the fluid under test, and thus an additional vibration compensating electronic circuit is not required. The flow meter of the present invention is simple in construction, highly reliable and inexpensive.

Furthermore, since the manufacturing method of the present invention does not produce residual stresses in the free surface of the vortex detector, the Karman vortex flow meter made by the inventive method further improves the measurement accuracy.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A Karman vortex flow meter for measuring the flow rate of a fluid under test, in a pipeline containing the fluid and having a longitudinal axis along which the fluid flows in a selected direction, comprising:
- a base secured to said pipeline abut an opening therein; and
- a vortex detector having a detector axis generally perpendicular to the longitudinal axis of the pipeline, said detector including:
  - a post supported by the base and aligned with the detector axis,
  - a balance weight aligned with and at least partially surrounding the post, said balance weight being movable along the axis of the post,
  - a detector flange supported by the base and substantially coaxial with and at least partially surrounding said post, said detector flange having a flexible surface orthogonal to the post,
  - a columnar force receiving part axially aligned with the post and extending from the bottom of said post into the pipeline, said receiving part shaped for producing a Karman vortex when inserted into the pipeline, wherein the Karman vortex applies a force to the force receiving part, and
  - a strain detecting element coupled to said flexible surface of the detector flange for detecting the Karman vortex force applied to the force receiving part and for producing an output signal corresponding to the detected Karman vortex.

2. The Karman vortex flow meter of claim 1, further comprising an upstream columnar body adjacent and substantially parallel with said force receiving part, and extending from the base into the pipeline.

3. The Karman vortex flow meter of claim 2, further comprising a downstream columnar body extending substantially parallel with said upstream columnar body and supported by the base, said downstream columnar body having a substantial hollow portion along its longitudinal axis to receive said force receiving part into said hollow portion.

4. The Karman vortex flow meter of claim 3, wherein said downstream columnar body further includes a pair of side openings facing one another, said side openings extending substantially parallel with and partially surrounding said hollow portion of the downstream columnar body, wherein said side openings communicate to one another and to said hollow portion.

5. The Karman vortex flow meter of claim 2, further comprising means for securing said force receiving part and said upstream columnar body to the pipeline opposite to the opening therein.

6. The Karman vortex flow meter of claim 2, wherein said upstream columnar body has a triangular cross-section having a base and two sides, and wherein said columnar force receiving part has a trapezoidal cross-section having a largest side opposing the base of the triangular upstream columnar body.

7. The Karman vortex flow meter of claim 6, wherein the base of the triangular upstream columnar body is substantially parallel with the largest side of the trapezoidal columnar force receiving part.

8. The Karman vortex flow meter of claim 1, wherein said strain detecting element of the vortex detector has first and second electrodes on opposite ends, said first electrode has a pair of split electrode portions having a splitting axis substantially parallel to the axis of the pipeline.

9. The Karman vortex flow meter of claim 8, wherein said strain detecting element of the vortex detector has a piezoelectric material element between said first and second electrode.

10. A Karman vortex flow meter for measuring the flow rate of a fluid under test, in a pipeline containing the fluid and having a longitudinal axis along which the fluid flows, comprising:
- a base secured to the pipeline about an opening therein; and
- a vortex detector having a detector axis generally perpendicular to the longitudinal axis of the pipeline, said detector including:
  - a post supported by the base and aligned with the detector axis,
  - a detector flange supported by the base and substantially coaxial with and at least partially surrounding said post, said detector flange having a flexible surface orthogonal to the post,
- a columnar force receiving part axially aligned with the post and extending from the bottom of said post into the pipeline, said receiving part having a length of approximately one half of the inside diameter of the pipeline, wherein the Karman vortex applies a force to the force receiving part,
- an upstream columnar body adjacent to and substantially parallel with said force receiving part, and extending from the base into the pipeline,
- a downstream columnar body extending from said base into the pipeline, said downstream columnar body substantially parallel with said upstream columnar body and said force receiving part, wherein the downstream columnar body includes a hollow portion along its longitudinal axis for receiving said force receiving part and a plurality of side openings which communicate with each other and said hollow portion, and
- a strain detecting element coupled to said flexible surface of the detector flange for detecting the Karman vortex force applied to the force receiving part and for producing an output signal corresponding to the detected Karman vortex force.

\* \* \* \* \*